June 21, 1955
R. F. GRAY
2,710,986
APPARATUS FOR APPLYING INSERTS OR
BOTTOMS IN PLASTIC CONTAINERS
Filed Nov. 9, 1950
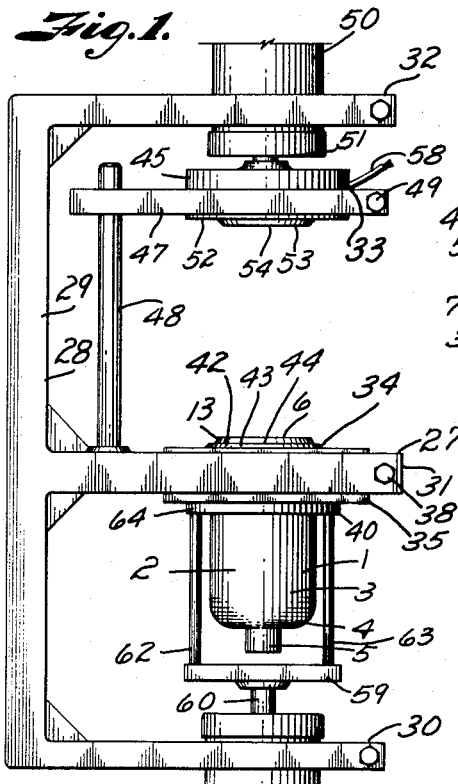
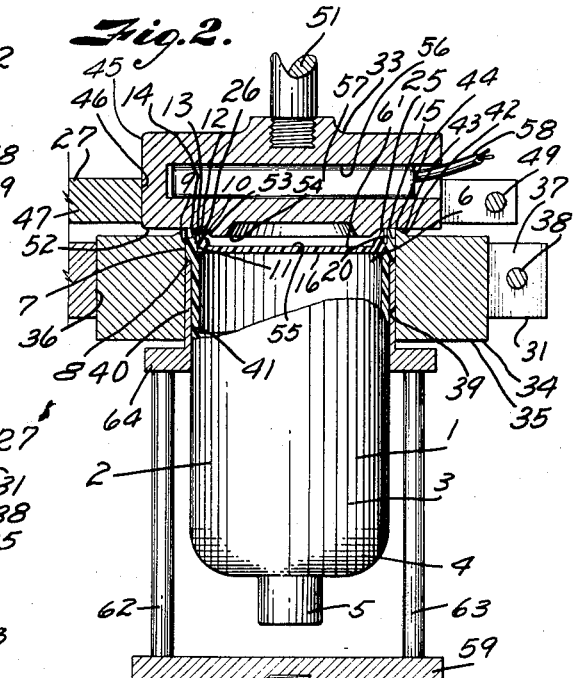
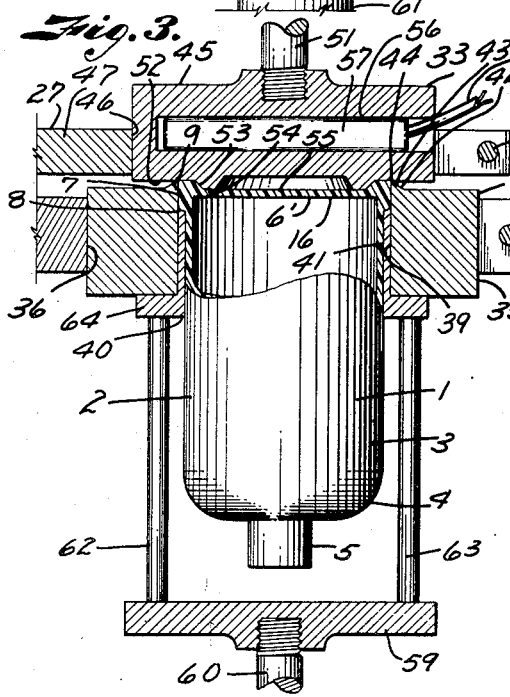
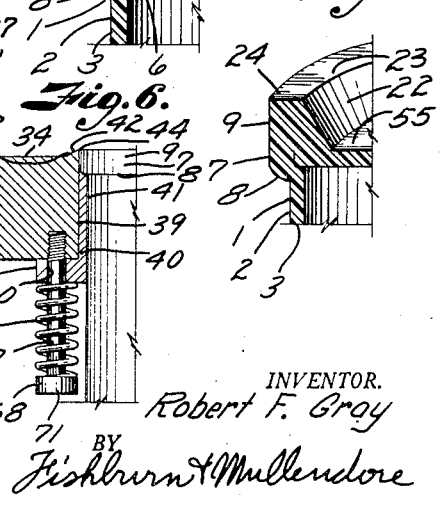
INVENTOR.
Robert F. Gray
BY
Fishburn & Mullendore
ATTORNEYS United States Patent Office 2,710,986
Patented June 21, 1955

2,710,986

APPARATUS FOR APPLYING INSERTS OR BOTTOMS IN PLASTIC CONTAINERS

Robert F. Gray, Kansas City, Mo., assignor to Injection Molding Company, Kansas City, Mo., a corporation of Missouri Application November 9, 1950, Serial No. 194,776

3 Claims. (Cl. 18—1)

This invention relates to an apparatus for applying inserts or bottoms in plastic containers of the type including a plastic body which is formed in high pressure molds and which has an opening for withdrawing the core of the mold, the opening being closed by a plastic disk having a fusible lip cooperating with a fusible lip on the body member to form an autogenous seal connecting the insert to the body member.

It has been proposed to effect such a seal by applying heat and pressure to the material of the lips but it has been found difficult to control the rate of fusion and to control flow of the fused material so as to avoid deformation and flashing or other displacement of the fused material which requires trimming and subsequent operations.

The principal object of the invention is to provide an apparatus for effecvtively and positively sealing the insert in the body of the container and to control fusion of the material so as to eliminate imperfect containers and to avoid further processing operations.

In accomplishing this and other objects of the invention as hereinafter pointed out, I have provided improved apparatus, the preferred form of which is illustrated in the accompanying drawing wherein:

Fig. 1 is a side elevational view of an apparatus for sealing an insert in the body portion of a plastic container, the heated form being shown in retracted position ready for insertion of a container in the fixed form.

Fig. 2 is an enlarged fragmentary section showing a container in position in the fixed form with the movable form moved in position to start the seal.

Fig. 3 is a view similar to Fig. 2, showing the parts after the seal has been effected.

Fig. 4 is an enlarged fragmentary section through the container showing the insert in position within the body of a container prior to effecting a seal.

Fig. 5 is a similar view after the seal has been made.

Fig. 6 is a fragmentary section through the fixed form showing a modification of the invention.

Referring more in detail to the drawings:

1 designates a hollow body or container such as a bottle having a body portion 2 that is adapted to be formed of plastic material under heat and pressure in a mold. The body portion 2 includes a side wall 3 that may be of cylindrical form and which is provided with a dome-like top 4 having a neck 5. An opening 6 is required to permit removal of the inner mold or core and is closed by an insert or bottom 6' which is also formed of plastic material similar to the body portion of the container. Formed on the body portion of the container is an annular rim 7 forming a shoulder 8 with the wall 3 and to provide an offset 9 to accommodate an inner inset shoulder 10 for seating the insert 6' thereagainst. The inner face of the rim portion 7 has cylindrical faces 11 and 12 with the face 12 offset outwardly from the face 11. Formed on the rim 7 in coaxial relation with the container is an annular lip 13 having its inner face formed as a continuation of the face 12 and having a tapered outer face 14 joining with the inner face 12 in a relatively thin edge 15. The insert 6' includes a disk-like portion 16 having a diameter to be snugly slidable within the annular face portion 11 as shown in Fig. 4. Inset slightly from the circumferential face 17 of the disk-portion is an annular flange 18 having an outer cylindrical face 19 cooperating with the face 12 of the body member to provide an annular sealing groove 20 therebetween. The inner surface of the flange 18 tapers outwardly in stepped annular faces 21 and 22 separated by an offset 23 substantially in plane with a similar offset portion 24 of the rim 7. The face 21 joins with the face 19 in an edge 25 similar to the edge 15 previously described to form a lip 26.

In carrying out the present invention, the lips 13 and 26 are fused and the fused material pressed into the annular groove 20 by means of an apparatus generally indicated by the reference numeral 27. The sealing apparatus 27 includes a frame 28 having an upright 29 carrying laterally extending arms 30, 31, and 32. The arms 31 and 32 are spaced apart to accommodate movement of a form member 33 while the arms 30 and 31 are spaced apart to accommodate the length of the container when inverted in a form 34 that is carried in the arm 31. The forms 33 and 34 are best illustrated in Figs. 2 and 3 and are preferably removably mounted.

The form 34 includes a circular body member 35 that is mounted in an opening 36 formed in the arm 31. The arm 31 has a slot 37 in its outer end intersecting the opening 36 whereby the body member 35 is clamped in position by a fastening device such as a bolt 38 that passes through the end of the arm. The body member 35 has an axial bore 39 conforming in diameter with the outer face of the rim portion of the container to receive the rim portion therein and to accommodate a slidable supporting ring or sleeve 40 substantially conforming in thickness to the offset 8 so that the inner annular face 41 thereof slidably embraces the wall portion 3 of a container as best shown in Fig. 2. Encircling the inner face 39 of the form member and projecting upwardly therefrom is a rib 42 having a downwardly sloping outer periphery 43 terminating in a ridge 44 adapted to be contacted by the upper form member as later described.

The upper form member 33 includes a body 45 that is clamped in an opening 46 in an arm 47, the arm 47 being coaxially guided for movement to and from the fixed form member 34 on a guide pin 48 that extends upwardly from the arm 31 as best shown in Fig. 1. The form member 33 is secured in the arm 47 by a clamping bolt 49 similar to the attachment of the fixed form 44, as previously described.

The upper arm 32 carries a fluid pressure cylinder 50 that is clamped in an opening of the upper arm similarly to attachment of the form members. Slidable in the cylinder under operation of a suitable pressure fluid is a piston (not shown) that connects with the movable form member 33 by a piston rod 51 to effect actuation of the movable form. The movable form has a substantially flat outer face 52 adapted to contact the rib 42 on the outer side of the fusible lips to be sealed. Provided on the movable form at the inner side of the face 52 is a depending annular rib 53 substantially conforming to the depth of the disk 16 from the offset 23 so that the bottom face 54 contacts the upper face 55 of the disk portion 16 of the insert. The outer periphery of the lip 53 is inclined at a slightly less angle than the tapered faces of the inserts so as to shape the inner circumference of the base of the container as later described. The body portion of the movable form member is provided with a recess 56 for accommodating a heating element 57 that is supplied with a suitable current through conductors 58. The sleeve or supporting member 40 is movably supported by a yoke 59 mounted on a piston rod 60 of an actuating cylinder 61 carried by the arm 30. Extending from the yoke 59 are diametrically spaced rods 62 and 63 that are connected at their upper ends with laterally extending flange 64 on the sleeve as best shown in Figs. 2 and 3. When pressure is applied to the rod 60 the flange is kept in contact with the underface of the fixed form as shown in Fig. 1.

In the form of invention shown in Fig. 6, the sleeve is resiliently retained in projected position by means of coil springs 66 which are mounted on the shanks 67 of bolts 68 that are threaded in the underside of the form, the sleeve being provided with a circumferential flange 69 having a plurality of openings 70 passing the shanks of the bolts. The coil springs have one end seated on heads 71 of the bolts while the opposite ends are engaged under the circumferential flange of the sleeve. Otherwise, the apparatus is of the same structure as that previously described.

In using the apparatus the movable form is moved to retracted position as shown in Fig. 1 to allow space for inserting the body member of a container bottom side up within the opening of the fixed form so that the shoulder 8 seats upon the sleeve 40, the bottom insert having previously been applied. The upper form heated by the heating element 57 is caused to move downwardly under pressure in the cylinder 50 until the face 52 of the form engages the rib 42 of the form 33. In this position the points 15 of the lips of the container make contact with the heated surface of the movable form to start fusing thereof. As the material fuses, the pressure fluid in the cylinder 61 is effected to move the sleeve upwardly within the fixed form so as to maintain contact of the lips with the heated form. As the material melts, it enters the groove 20 incidental to the pressure applied in the cylinder 61. When the circumferential flange 64 engages the form the seal is complete and the face 52 of the upper form member forms the flat bottom face of the container with any surplus fused material being retained in position by contact of the upper form member with the annular tip of the rib 42. At this time, the flat face of the rib 53 has engaged the disk portion of the insert so as to form a flare on the inner face of the base of the container as shown in Fig. 5. The movable form is then raised out of position to permit removal of the container.

When the insert is thus sealed in the body of the container the base thereof is accurately shaped and there is no subsequent operations necessary in trimming off flashes or correcting deformities in the shape of the container. There is no need for testing the containers since all of the containers will have a leak-tight, accurately formed seal.

What I claim and desire to secure by Letters Patent is:

1. An apparatus for sealing an insert in a thermoplastic container comprising a stationary form member positioned between two movable members, the lower movable member being a gripping member and the upper movable member being a heating member, said stationary member having an opening therethrough, said gripping member movable between two extremes and positioned at one extremity of its motion so as to extend partially into one end of said opening in the stationary member, said gripping member having an opening therein to receive a container and limiting means adapted to abut said stationary member to restrict its travel into the stationary form member opening, said heating member adapted to be moved against the opposite side of said stationary member from said gripping member to close one end of the opening in the stationary member, and means whereby said gripping member may be moved into the opening of said stationary member to its limit when said heating member abuts the stationary member.

2. An apparatus for sealing a bottom insert in a container, said container and insert being formed of thermoplastic material and having circumferential opposed fusing portions extending axially of the container, which fusing portions are to be reduced in length by a fixed amount in the sealing process, said apparatus comprising a stationary form member positioned between two movable members, the lower movable member being a gripping member and the upper movable member being a heating member, said stationary member having an opening therethrough, said gripping member movable between two extremes and positioned at one extremity of its motion so as to extend partially into one end of said opening in the stationary member, said gripping member having an opening therein to receive a container and limiting means adapted to abut said stationary member to restrict its travel into the stationary form member opening, said heating member adapted to be moved against the opposite side of said stationary member from said gripping member to close one end of the opening in the stationary member, and means whereby said gripping member may be moved into the opening of said stationary member to its limit when said heating member abuts the stationary member, the distance between the two extremes of travel of the gripping member being equal to the reduction in length of the fusing portions of the insert and container in the sealing process.

3. An apparatus for sealing a bottom insert in a thermoplastic container comprising a frame having a lower, an intermediate and an upper arm fixedly attached thereto, a stand mounted on said intermediate arm and an auxiliary arm slidably mounted on said stand, a stationary form member mounted on said intermediate arm, said stationary form member positioned between two movable members, the lower movable member being a gripping member and the upper movable member being a heating member, said stationary member having an opening therethrough, said gripping member movable between two extremes, and positioned at one extremity of its motion so as to extend partially into one end of said opening in the stationary member, said gripping member having an opening therein to receive a container and limiting means adapted to abut said stationary member to restrict its travel into the stationary form member opening, said heating member attached to said auxiliary arm, means attached to said upper arm and connected to said heating member adapted to move said heating member against the opposite side of said stationary member from said griping member to close one end of the opening in the stationary member, and means attached to said lower arm and connected to said gripping member adapted to move said gripping member into the opening of said stationary member to its limit when said heating member abuts the stationary member.

References Cited in the file of this patent
UNITED STATES PATENTS

| | | |
|---|---|---|
| 1,421,748 | Willard | July 4, 1922 |
| 1,607,389 | Claus | Nov. 16, 1926 |
| 1,648,721 | Claus | Nov. 8, 1927 |
| 1,776,888 | Clark | Sept. 30, 1930 |
| 1,856,319 | Cooper | May 3, 1932 |
| 2,041,357 | Kraft | May 19, 1936 |
| 2,169,315 | Yngve | Aug. 15, 1939 |
| 2,285,220 | Morrell | June 2, 1942 |
| 2,386,498 | Ostrander | Oct. 9, 1945 |
| 2,502,031 | Sigel | Mar. 28, 1950 |
| 2,588,604 | Archer | Mar. 11, 1952 |
| 2,635,289 | Owens | Apr. 21, 1953 |

FOREIGN PATENTS

| | | |
|---|---|---|
| 559,111 | Great Britain | Dec. 2, 1948 |